United States Patent Office 3,786,115
Patented Jan. 15, 1974

3,786,115
SUSPENSION POLYMERIZATION PROCESS
Hiroshi Osuga, Yokohama, and Shoichi Kobayashi, Tokyo, Japan, assignors to Nihon Polystyrene Kogyo K.K., Kawasaki-ku, Kawasaki-shi, Kanagawa, Japan
No Drawing. Continuation-in-part of abandoned application Ser. No. 657,014, July 31, 1967. This application Dec. 23, 1970, Ser. No. 101,119
Int. Cl. C08f 1/11, 7/04, 19/08
U.S. Cl. 260—880 R                      17 Claims

ABSTRACT OF THE DISCLOSURE

Process for producing styrenic polymer having a particle grain size distribution such that greater than 70% of the polymer particles have a grain size of 14 to 40 mesh, comprising polymerizing, under the conditions of suspension polymerization, an aqueous suspension of a polymerizable styrene monomer or a solution of such a monomer containing a diene polymer, in which the suspension polymerization is conducted while stabilizing the suspension by adding a suspension stabilizing system consisting essentially of about 0.01–1% of hydroxyethyl cellulose and about 0.01–3% of fine particles of a substantially water insoluble, inorganic phosphate and/or carbonate, based on the weight of suspension, and further in which the suspension polymerization is conducted more preferably while adding to the suspension about 0.001–0.02% by weight of an anionic surface active agent based on the weight of the suspension in addition to the above-mentioned additives.

This application is a continuation-in-part of U. S. Ser. No. 657,014, filed July 31, 1967, now abandoned.

BACKGROUND OF THE INVENTION (1) Field of the invention

The present invention relates to an improved suspension polymerization method wherein the dispersion in water which is a suspension medium can be easily conducted, the suspension thus formed is maintained stably even at a high polymerization temperature, and a styrenic polymer having excellent properties and desirable grain size distribution can be obtained.

In particular, the present invention relates to a process for polymerizing, under the conditions of suspension polymerization, an aqueous suspension of a polymerizable styrene monomer or a solution of such a monomer containing a diene polymer, in which the suspension polymerization is conducted while stabilizing the suspension by adding about 0.01–1% of hydroxyethyl cellulose and about 0.01–3% of at least one of fine particles of a substantially water insoluble, inorganic phosphate and/or carbonate, based on the weight of the suspension, and further in which the suspension polymerization is conducted more preferably while adding to the suspension about 0.0001–0.02% by weight of an anionic surface active agent based on the weight of the suspension in addition to the above-mentioned additives.

(2) Description of the prior art

In general, a suspension polymerization of a vinylic monomer is conducted by dispersing or suspending the monomer drops in water in the presence of a dispersing agent (or a suspension stabilizer) capable of maintaining the system at a stable state. As the dispersing agent, various materials have been proposed.

One of such proposals is disclosed in Japanese patent publication No. 1298/54 in which the suspension polymerization is carried out by adding to a suspension about 0.1–5% based on the weight of the whole suspension of a substantially water insoluble phosphate as a suspension stabilizer and about 0.0005–0.5% based on the weight of the suspension of an anionic surface active agent as a suspension aid.

The substantially water insoluble phosphate is an excellent suspension stabilizer since it prevents the fine drops of a monomer under polymerization or a polymerization product from being welded or aggregated to each other, whereby the suspension system is maintained stably and polymer particles having a preferable grain size distribution can be obtained. Furthermore, it is important to adjust the grain size distribution of the formed polymer particles in suspension polymerization for profitably conducting the treatment, after the end of the polymerization, as well as for obtaining an excellent polymer. On the other hand, there is a difficulty in such known methods in that such a substantially water insoluble phosphate has an insufficient power for dispersing in water a monomer or a monomer solution having dissolved therein a diene polymer as liquid particles. The difficulty becomes particularly remarkable when the monomer or a monomer solution containing a diene polymer is viscous, which is a disadvantage requiring an excessive power for stirring and makes it very difficult to make the dispersion sufficiently uniform.

For example, in the case of obtaining a polystyrenic thermoplastic resin having a high impact resistance by dissolving less than 25% by weight of a natural or synthetic rubber into styrene, polymerizing the solution under conditions of bulk polymerization to form a partially polymerized product having less than 50% by weight of a solid content, and thereafter polymerizing the suspension under conditions of suspension polymerization to form an interpolymer, the partially polymerized product having such a high solid content is highly viscous. Hence, it is difficult or impossible to disperse such a product in water by the addition of only an inorganic salt, such as, a substantially water insoluble phosphate as a suspending agent.

To overcome such a difficulty, an improved method has been proposed in Japanese Pat. No. 3740/62 in which a suspension stabilizer, preferably polyvinyl alcohol, in particular hydrolyzed polyvinyl acetate having a middle or high molecular weight, is added to the suspension.

Such water-soluble high molecular weight material may be useful for dispersing a monomer or a monomer solution containing a polymer the dispersion of which in water is not easy, as mentioned above, at the beginning of the suspension polymerization. On the other hand, it is difficult to obtain polymer particles thus formed in a desired grain size distribution and water tends to be carried in the polymer particles formed.

Moreover, where a higher polymerization temperature is required for reducing the polymerization period of time, the above-mentioned drawbacks become greater at a higher temperature.

Accordingly, there has been a demand for an improved suspension polymerization process in which the technical difficulties or disadvantages in the above-mentioned conventional proposal can be overcome, a viscous monomer can be easily and uniformly dispersed, and polymer particles having a preferred grain size distribution can be obtained.

To meet this demand, it is considered desirable to conduct the polymerization in a stable state by using simultaneously suspending agents having different functions as mentioned above while compensating for their respective faults.

However, the simultaneous use of such suspending agents having different functions does not usually exhibit merit different than expected. In fact, for example, even if polyvinyl alcohol is used together with a substantially water insoluble phosphate, the merit of the latter suspension stabilizer is not exhibited. Hence, it is impossible to anticipate whether by using both stabilizers together an improved suspension polymerization can be made by utilizing the merits of both stabilizers and what kind of combination is effective.

SUMMARY OF THE INVENTION

The inventors have studied the possibility of conducting the suspension polymerization while satisfying the above-mentioned requirement by using together the above suspension stabilizers and have found that in spite of the fact that the possibility of improving the suspension polymerization by using the suspension stabilizers together cannot utterly be anticipated, a combination of hydroxyethyl cellulose, a substantially water insoluble or water insoluble (the term substantially water insoluble in this invention includes water insoluble) inorganic phosphate and/or a carbonate exhibits not only their individual merits, while compensating for their respective disadvantages, but also provides further improved multiplied effects.

In the past, a suspension system consisting of a substantially water insoluble or water insoluble inorganic phosphoric acid and polyvinyl alcohol was proposed. However, from the viewpoint that hydroxyethyl cellulose used in the combination of the present invention does not show the desired effects (utilized substantially alone as a suspension agent at temperatures of 90° C. or more) of making the conduct of the reaction possible at a useful polymerization speed, while polyvinyl alcohol shows a substantial suspension effect as a suspension system at 90° C., if employed alone, the effect indicated in the combination of the present invention is quite unexpected.

Moreover, it has been found that when such a combination is employed together with an anionic surface active agent, a preferable result can be obtained. Particularly preferable and necessary amounts of the additives are from about 0.01 to 1% of hydroxyethyl cellulose, from about 0.01 to 3% of at least one of a substantially water insoluble inorganic phosphate or carbonate, and from about 0.0001 to 0.02% of an anionic surface active agent based on the weight of the suspension to be subjected to suspension polymerization.

Therefore, an object of this invention is to provide an improved suspension polymerization method for producing styrenic polymer particles having excellent properties and having a particle grain size distribution such that greater than 70% of the polymer particles have a grain size of 14 to 40 mesh [1] by suspension polymerization of a styrenic monomer or a solution of a polymer in the monomer, wherein the disadvantages of the known propositions can be profitably overcome, the dispersion in a suspension medium, water can be conducted easily, and the suspension thus formed can be stably maintained even at a higher polymerization temperature. Another object of this invention is to provide an improved suspension polymerization method by using an anionic surface active agent together in the above-mentioned improved suspension polymerization.

Further objects and the merits of the present invention will become more apparent from the following descriptions.

DETAILED DESCRIPTION OF THE INVENTION

The fine particles of a substantially water insoluble phosphate or a substantially water insoluble carbonate used in this invention are particles of a phosphate or a carbonate of calcium, barium, strontium, or magnesium having a grain size of from 0.1 micron to ten microns, and an average grain size of several microns or less. For preparing such particles of a salt, a precipitation method by double decomposition is suitable. As the examples of the production, there are illustrated the preparation of

[1] ASTM (pass 14, retained on 40 mesh).

tri-calcium phosphate by the reaction of tri-sodium phosphate and calcium chloride and the preparation of barium carbonate by the reaction of sodium carbonate and barium chloride. These salts may be used in the form of solid powders, or a suspension of the salt formed by the aforesaid double decomposition may be used, as it is, as the suspension medium for the monomer. Also, the salts may be used as a mixture thereof in the above-mentioned range. The amount of the salt is from about 0.01 to 3% and particularly from about 0.2 to 1.0% based on the weight of the suspension.

The amount of hydroxyethyl cellulose must be in the range of from about 0.01 to 1% most preferably from about 0.02 to 0.1% based on the weight of the suspension to be polymerized.

According to the process of this invention, the ratio of the monomer or a monomer solution having dissolved therein a polymer to water can be selected from a wide range, e.g. 10/90 to 60/40, which is one of the features of this invention.

The monomer to be polymerized by the process of this invention is styrene and a mixture of styrene and comonomer copolymerizable therewith, such as alpha-methyl styrene, acrylonitrile and methyl methacrylate. These components can be used at a styrene:monomer copolymerizable therewith weight ratio of 100:0 to 50:50.

Further, by the monomer solution containing a diene polymer to be polymerized by the process of this invention is meant the aforesaid monomer or monomer mixture having dissolved therein a homopolymer or a coplymer of a conjugated diene compound, such as polybutadiene rubber and butadiene-styrene rubber. These components can be used at a styrene or styrene plus monomer copolymerizable therewith:conjugated diene polymer weight ratio of 100:0 to 75:25.

The term monomer solution also means a solution prepared by polymerizing a part of the aforesaid monomer or monomer mixture, that is, a solution formed by dissolving a polymer of the monomer into the monomer. Preferably, polymerization of such a monomer solution would not exceed a 40% by weight styrene conversion.

It further includes a solution prepared by dissolving a diene polymer into the monomer and forming therein an interpolymer by bulk-polymerization or solution polymerization, that is, a solution of the monomer containing an interpolymer thereof formed therein. In both of the above initial systems, these "solutions" are preferably polymerized at 80–130° C. for 2–5 hours, either with or without art used peroxides.

In the second process of this invention wherein an anionic surface active agent is used, there may be employed an alkali salt of an aliphatic acid, such as, sodium oleate or potassium stearate and an alkali salt of an aralkyl sulfonate, such as, sodium dodecylbenzene sulfonate.

At the polymerization of the above-mentioned monomer or a monomer solution, the use of a polymerization initiator is preferable. As the polymerization initiator, there may be used a well-known organic peroxide, such as, dibenzoyl peroxide, di-t-butyl-benzoyl peroxybenzoate, dicaproyl peroxide and dilauroyl peroxide. Usually from 0 to 1% catalyst, based on the solution weight, is used.

In an embodiment of the suspension polymerization according to the process of this invention, a suspending agent is added into a dispersion medium, water with stirring, the aforesaid monomor or monomer solution is added into the aqueous medium with stirring to provide a suspension. After adding a polymerization initiator, if necessary, the polymerization of the aqueous suspension is conducted at a high temperature. Of course, the dispersion medium and the dispersing agent may be added into the dispersoid or the three components may be mixed at the same time with stirring. Further, in another embodiment of this invention, at the beginning of the dispersion under stirring, hydroxyethyl cellulose alone or together with a part of the substantially water insoluble inorganic phosphate and/or carbonate may be added into the system and, after dispersion, the whole or a part of the aforesaid salt or salts.

As mentioned above, the substantially water insoluble inorganic phosphate and carbonate may be used together, but by using them in a specific ratio, the stabilizing effect for the suspension can be further increased and excellent results can be obtained. In the case of employing the most effective ratio of them, by conducting the suspension polymerization according to the first process of this invention, there can be obtained polymer particles prepared according to the second process of this invention in which an anionic surface active agent is employed. In the case of using tri-calcium phosphate and calcium carbonate together, the profitable ratio of them is from 1:2 to 2:1 in weight ratio and the optimum ratio is about 1:1.

While the invention has been explained above about specific preferable embodiments, various changes can be practiced within the scope of this invention.

In the suspension system of this invention, besides the above-mentioned additives, other additives usually used in conventional suspension polymerization, such as, a chain transfer agent and an acid or a salt for adjusting the pH.

At polymerization, polymer particles can be obtained by starting the reaction at normal temperature to 70° C. and then continuing the reaction for 5–20 hours at a temperature of 80–140° C. The polymer particles can be recovered in the pure state by separating them from the aqueous medium by filtration, washing with an acid such as diluted hydrochloric acid or warm water and drying them.

Further, in the process of this invention, during the polymerization, a swelling agent, such as, an aliphatic hydrocarbon or a derivative thereof may be incorporated in the polymerizing particles.

Of course, the swelling agent may be incorporated in the polymer particles by compressing in the suspension of which the polymerization has been substantially finished.

By the process of this invention, a monomer which has been difficult or impossible to disperse by conventional methods can be easily and preferably dispersed to provide a polymer having a particle grain size distribution such that greater than 70% of the polymer particles have a grain size of 14 to 40 mesh, and the suspension thus formed can be polymerized in a stable state. Therefore, the invention has such merit that the separation of the polymer particles from the suspension and the subsequent treatment therefor can be profitably conducted. Polymer particles having a larger grain size than 14 mesh are slow drying, and fine particles of over 40 mesh cause process loss.

Further, since by the process of this invention the suspension system can be maintained stably even at a higher temperature, the period of time required for the polymerization can be reduced. This makes the process economically profitable, and permits polymer particles having excellent properties to be obtained.

According to the second process of this invention, the particle size distribution of the polymer particles thus obtained can be further improved without lowering the merits of the first process. The effect of adding surfactant is to provide a small particle size distribution. Adding only surfactant rather than adding it with HEC or TCP has the effect of providing a small particle size in a small amount. However, in the addition of surfactant, if the amount is out of the range disclosed, then the size distribution of the polymer produced is not suitable.

Now, the invention will be explained by the following examples, wherein percent and part are by weight.

EXAMPLE 1

A mixture having the following composition was stirred in a reaction chamber at room temperature to provide an aqueous suspension:

| | Parts |
|---|---|
| Styrene | 100 |
| Water | 90 |
| Tri-calcium phosphate | 0.6 |
| Hydroxyethyl cellulose (Cellosize WP4400 made by Union Carbide Co.) | 0.1 |
| Benzoyl peroxide | 0.1 |

The suspension polymerization was conducted for 4 hours at 90° C., for one hour at 100° C., and for one hour at 110° C.; thereafter the polymer thus formed was separated by filtration.

The polymer was washed with water, diluted hydrochloric acid and then warm water and dried.

The resulting polymer was sieved by means of standard sieves to provide beautiful transparent particles having the following particle distribution:

| Mesh: | Percent |
|---|---|
| Above 14 | 10 |
| 14–16 | 18 |
| 16–18 | 23 |
| 18–20 | 20 |
| 20–25 | 13 |
| 25–30 | 7 |
| 30–40 | 5 |
| Less than 40 | 4 |

EXAMPLE 2

A mixture having the following composition was stirred in a reaction chamber to provide an aqueous suspension:

| | Parts |
|---|---|
| Styrene | 85 |
| Acrylonitrile | 15 |
| Water | 100 |
| Barium carbonate | 1 |
| Hydroxyethyl cellulose (Cellosize WP4400) | 0.5 |
| Di-t-butyl peroxide | 0.5 |
| n-Dodecylmercaptan | 0.02 |

The aqueous suspension was subjected to suspension polymerization for 3 hours at 100° C., and 1.5 hours at 130° C.; thereafter the polymer thus formed was separated.

By treating the thus obtained polymer as in Example 1, beautiful spherical polymer particles are obtained.

| Particle size, mesh: | Percent |
|---|---|
| Above 14 | 9 |
| 14–16 | 17 |
| 16–18 | 23 |
| 18–20 | 20 |
| 20–25 | 14 |
| 25–30 | 8 |
| 30–40 | 5 |
| 40 mesh pass | 4 |

EXAMPLE 3

Into 100 parts of styrene there was dissolved 7 parts of a styrene-butadiene copolymer in which the ratio of styrene to butadiene was 25:75 and from the monomer solution, a mixture having the following composition was prepared in a reaction chamber with stirring to provide an aqueous suspension:

| | Parts |
|---|---|
| Monomer solution | 107 |
| Water | 100 |
| Tri-calcium phosphate | 1 |
| Hydroxyethylcellulose (Cellosize WP4400) | 0.2 |
| Dibenzoyl peroxide | 0.1 |
| Di-t-butyl peroxide | 0.05 |

The polymerization was conducted for 2 hours at 85° C., for 2 hours at 95° C., and for 2 hours at 120° C. The polymer particles were treated as in Example 1. Also, when the polymer was not pressed to provide a test piece and the impact strength of the sample was measured by the ASTM D256-56T method, the value was 0.7 ft.-lb./in.-notch.

| Particle size, mesh: | Percent |
|---|---|
| Above 14 | 5 |
| 14-16 | 7 |
| 16-18 | 18 |
| 18-20 | 20 |
| 20-25 | 25 |
| 25-30 | 18 |
| 30-40 | 5 |
| 40 mesh pass | 2 |

EXAMPLE 4

Into 100 parts of styrene was dissolved 10 parts of a polybutadiene rubber by heating while stirring. The solution was then bulk-polymerized until the solid content reached 26%. From the partially polymerized product was prepared the aqueous suspension having the following composition:

| | Parts |
|---|---|
| Partial polymer | 110 |
| Water | 100 |
| Calcium carbonate | 0.8 |
| Hydroxyethyl cellulose (Cellosize WP4400) | 0.4 |
| Dibenzoyl peroxide | 0.1 |
| Di-t-butyl peroxide | 0.1 |

The polymerization was conducted for one hour at 80° C., for one hour at 90° C., for one hour at 100° C., and for two hours at 110° C.; thereafter the polymer thus prepared was separated.

By treating the polymer as in Example 1, beautiful and spherical polymer particles were obtained having the following grain size distributions:

| Mesh: | Percent |
|---|---|
| Above 14 | 9 |
| 14-16 | 18 |
| 16-18 | 22 |
| 18-20 | 20 |
| 20-25 | 12 |
| 25-30 | 8 |
| 30-40 | 6 |
| Less than 40 | 5 |

When the impact strength was measured about this polymer as in Example 1, the value was 1.8 ft.-lb./in.-notch.

EXAMPLE 5

Into 100 parts of styrene was dissolved 6 parts of a polybutadiene rubber by heating while stirring and the solution was subject to bulk polymerization until the solid content in the system became 33%.

Apart from this, a solution of 0.8 part of tri-sodium phosphate in 60 parts of water was mixed with a solution of 0.5 part of calcium chloride in 40 parts of water with stirring at normal temperature to form tri-calcium phosphate solution. From them was prepared a mixture having the following composition in a reaction chamber with stirring to provide an aqueous suspension:

| | Parts |
|---|---|
| Partial polymer | 100 |
| Suspension of tri-calcium phosphate (0.3% tri-calcium phosphate) | 100 |
| Hydroxyethyl cellulose (Cellosize WP4400) | 0.05 |
| Dibenzoyl peroxide | 0.1 |
| Di-t-butyl peroxide | 0.05 |

The suspension polymerization was conducted by the same temperature cycle as in Example 4 and thus obtained polymer was separated. The polymer obtained by treating as in Example 1 was a beautiful spherical particle having about the same size distribution as that in Example 4 and the impact strength of it was 0.9 ft.-lb./in.-notch.

| Particle size, mesh: | Percent |
|---|---|
| Above 14 | 8 |
| 14-16 | 19 |
| 16-18 | 22 |
| 18-20 | 21 |
| 20-25 | 12 |
| 25-30 | 7 |
| 30-40 | 6 |
| 40 mesh pass | 5 |

EXAMPLE 6

Into 100 parts of styrene was dissolved 65 parts of a polybutadiene rubber and the solution was bulk polymerized until the solid content reached 20%. From the polymer solution was prepared a mixture having the following composition in a reaction chamber with stirring at 70° C. to provide an aqueous suspension:

| | Parts |
|---|---|
| Partial polymer | 100 |
| Calcium phosphate | 0.3 |
| Calcium carbonate | 0.3 |
| Hydroxyethyl cellulose (Cellosize WP4400) | 0.06 |
| Water | 100 |
| Dibenzoyl peroxide | 0.2 |

The polymerization was conducted for one hour at 80° C., for two hours at 90° C., for one hour at 100° C., for one hour at 120° C., and for one hour at 135° C.; thereafter the polymer was separated.

| Particle size, mesh: | Percent |
|---|---|
| Above 14 | 22 |
| 14-16 | 38 |
| 16-18 | 25 |
| 18-20 | 10 |
| 20-25 | 3 |
| 25-30 | 2 |
| 30-40 | 0 |
| 40 mesh pass | 0 |

COMPARATIVE EXAMPLE 1

For comparison, the same procedure as in Example 4 was repeated while, however, the amount of calcium carbonate was 2 parts and no hydroxyethyl cellulose was used. It was possible to disperse a partial polymer thus obtained in water. Even when the dispersion was conducted by stirring at 70° C., the results were the same.

Furthermore, when the same procedure as in Example 4 was repeated while, however, no calcium carbonate was used and 0.2 part of hydroxyethyl cellulose was used, an aqueous suspension was obtained. However, although when the suspension was polymerized for one hour at 80° C., and for one hour at 90° C., the polymerization was attained, when the temperature was increased to 100° C. the suspension lost its stability after 10 minutes and the particles in the polymer coagulated with each other, which made it impossible to continue the polymerization further.

EXAMPLE 7

The same procedure as in Example 1 was repeated while 0.001 part of sodium dodecylbenzene sulfonate was added in the formation of the aqueous suspension of polymer.

The polymer obtained comprises beautiful transparent particles and the grain size distribution was as follows:

Mesh: Percent
- Above 14 _____ 2
- 14–18 _____ 3
- 18–20 _____ 16
- 20–25 _____ 23
- 25–30 _____ 20
- 30–40 _____ 19
- 40–50 _____ 11
- Less than 50 _____ 6

EXAMPLE 8

The same procedure as in Example 4 was repeated while 0.01 part of sodium oleate was added in the formation of the aqueous suspension of the partial polymer. The polymer particles thus obtained had the following grain size distribution:

Mesh: Percent
- Above 14 _____ 2
- 14–18 _____ 3
- 18–20 _____ 18
- 20–25 _____ 24
- 25–30 _____ 21
- 30–40 _____ 16
- 40–50 _____ 9
- Less than 50 _____ 6

EXAMPLE 9

The purpose of this example was to prove that by conducting suspension polymerization using a stabilizing agent of from 0.1–1% hydroxyethylcellulose (hereinafter HEC) and from 0.01–3% of an inorganic phosphate or an inorganic carbonate the improved results of the present invention are obtainable, but that, unexpectedly, by substituting into the rubber-modified polystyrene process of the present invention the HEC or phosphate or carbonate values as used by the prior art, i.e., in U.S. Pat. 3,425,966 Ronden et al., one does not obtain the results of the present invention. The data obtained support the conclusion of applicants that it is unexpected that by following the HEC/phosphate or carbonate ratios of the present invention, one obtains a highly efficient process, but that by varying from these values in accordance with the teachings of the above prior art, one does not obtain acceptable results.

In the experimentation, the exact procedure of Examples 3, 4 or 8, as indicated in Table I, was followed, with the exception that the values utilized in this table were used.

With reference to this table, it should be noted that the present invention discloses a minimum HEC value of 0.6 part, whereas the prior art, i.e., Ronden et al., discloses a maximum HEC value of 0.0017%. In table I, TCP stands for tri-calcium phosphate, BPO stands for dibenzoyl peroxide, DTB stands for di-t-butyl peroxide, NaDBS stands for sodium dodecyl benzene sulfonate, SO stands for sodium oleate, and the remainder of the terms are believed self-explanatory with reference to the examples referred to.

As shown in the table, when the amount of suspension stabilizing agent used in the present invention is outside the scope of the present invention, the suspension system breaks during polymerization.

TABLE I

| Run No. | Styrene | PBR | SBR | Water | TCP | CaCO₃ | HEC | BPO, DTB | NaDBS | SO |
|---|---|---|---|---|---|---|---|---|---|---|
| 1 | 100 | | 7 | 100 | 1 | | ¹ 0.0035 | 0.1, 0.05 | | |
| 2 | 100 | 10 | | 100 | | 0.8 | 0.0035 | 0.1, 0.1 | | |
| 3 | 100 | | 7 | 100 | 1 | | ² 0.012 | 0.1, 0.05 | | |
| 4 | 100 | 10 | | 100 | | 0.8 | 0.4 | 0.1, 0.1 | | ³ 1.44 |
| 5 | 100 | 10 | | 100 | | 0.8 | 0.4 | 0.1, 0.1 | | 0.04 |
| 6 | 100 | 10 | | 100 | | 0.8 | 0.0035 | 0.1, 0.1 | | 1.44 |
| 7 | 100 | | 7 | 100 | 1 | | 0.0035 | 0.1, 0.05 | 1.44 | |

| Run No. | Content | Result |
|---|---|---|
| 1 | The amount of HEC in Example 3 was substituted by one shown in Ronden. | Broken during the reaction at 85° C. (Particles were coagulated to paste). |
| 2 | The amount of HEC in Example 4 was substituted by one shown in Ronden. | Broken during elevating to 85° C. (Particles were coagulated to paste). |
| 3 | The amount of HEC in Example 3 was substituted by a middle point of Ronden and present invention. | Do. |
| 4 | The amount of surface active agent in Example 8 was substituted by one shwon in Ronden. | Do. |
| 5 | The amount of surface active agent in Example 8 was substituted by a middle amount of Ronden and present invention. | Do. |
| 6 | The amounts of HEC and surface active agent in Example 8 were substituted by these shown in Ronden. | Do. |
| 7 | The amounts of HEC and newly added surface active agent were substituted by these shown in Ronden. | Broken during elevating to 95° C. after reaction at 85° C. for 2 hours. (Particles were coagulated to paste). |

¹ Corresponding to 0.0017% for total suspension.
² Corresponding to 0.0058% for total suspension.
³ Corresponding to 0.685% for total suspension.

EXAMPLE 10

The purpose of this example was to demonstrate that the TCP–HEC system is a most superior suspension agent. The exact procedure of Example 3 was followed in performing the experimentation reported in Table II, with the changes indicated in Run Nos. 8–23 being substituted into Example 3. The only change from run to run was in the identity of the first material.

TABLE II

| Run No. | Dispersion system | Result |
|---|---|---|
| 8 | Polyvinyl alcohol | Suspension particles polymerized stably to the end. |
| 9 | do.¹ | Do. |
| 10 | Methyl cellulose | Particles coagulated to a paste during polymerization. |
| 11 | do.¹ | Do. |
| 12 | Starch | Prepolymer did not disperse. |
| 13 | do.¹ | Do. |
| 14 | Carboxymethyl cellulose | Particles coagulated to a paste during polymerization. |
| 15 | do.¹ | Do. |
| 16 | Polyacrylic acid | Do. |
| 17 | do.¹ | Do. |
| 18 | Nonionic surface active agent | Do. |
| 19 | do.¹ | Do. |
| 20 | Anionic surface active agent | Do. |
| 21 | do.¹ | Do. |
| 22 | Hydroxyethyl cellulose | Do. |
| 23 | do.¹ | Suspension particles polymerized stably to the end. |

¹ Plus TCP.

The particle size distributions of the systems which could be dispersed in Table II are as follows:

| Particle size | Percent of— | | |
|---|---|---|---|
| | TCP-HEC | PVA | PVA-TCP |
| 10 mesh on | 6 | 84 | 66 |
| 10–14 | 8 | ≅16 | 25 |
| 14–20 | 60 | ≅1 | 7 |
| 20–25 | 15 | | 2 |
| 25–30 | 6 | | |
| 30–40 | 3 | | |
| 40 mesh pass | 2 | | |

From the results of Table II, it is clear that the suspension stabilizing agent of the present invention forms a polymer which is preferable in distribution of particle size while the suspension system of PVA or PVA+TCP is inconveniently inclined toward the side of enormous particle. Therefore, it can be concluded that HEC and PVA are different in their functional mechanism.

EXAMPLE 11

The object of this example was to show that acrylonitrile, methylmethacrylate and α-methylstyrene can be used as comonomers and also that various radical catalyst can be used in the present invention.

The experiment was conducted with the recipes and under the same conditions described in Table III and in all cases the suspension polymerization was stably effected to the end. The polymer particles obtained were uniform in distribution of particle size.

TABLE III

| Run No | Parts of— | | | |
|---|---|---|---|---|
| | 24 | 25 | 26 | 27 |
| Styrene | 75 | 45 | 80 | 85 |
| Acrylonitrile | 15 | | 10 | |
| Methylmethacrylate | | 45 | | |
| α-Methylstyrene | | | | 5 |
| PBR | 10 | 10 | 10 | 10 |
| Water | 100 | 100 | 100 | 100 |
| TCP | 1 | 1 | 1 | 1 |
| HEC | 0.4 | 0.4 | 0.4 | 0.4 |
| Dilauroyl peroxide | 0.3 | | 0.3 | |
| Azobisisobutyronitrile | | 0.1 | | 0.1 |
| Tert-butyl perbenzoate | | | 0.05 | 0.05 |
| Di-tert-butyl peroxide | 0.05 | 0.05 | | |
| Conditions | 80° C./3 hours, 120° C./2 hours | | | |
| 14–40 mesh, percent | 72 | 75 | 83 | 78 |

It will be seen that greater than 70% of the particles will pass a 14 mesh screen but will be retained upon a 40 mesh screen, thereby meeting the particle size distribution object of the present invention.

While the invention has been particularly shown and described with reference to preferred embodiments thereof, it will be understood by those skilled in the art that various changes in form and detail may be made therein without departing from the spirit and scope of the invention.

What is claimed is:

1. In a suspension polymerization process in which there is formed an aqueous suspension of a material to be polymerized selected from the group consisting of:
   (1) styrene,
   (2) a mixture of styrene and a comonomer selected from the group consisting of alpha-methyl styrene, acrylonitrile and methylmethacrylate,
   (3) styrene and a conjugated diene polymer selected from the group consisting of polybutadiene rubber and styrene-butadiene rubber,
   (4) styrene, a comonomer polymerizable therewith selected from the group consisting of alpha-methyl styrene, acrylonitrile and methylmethacrylate, plus a conjugated diene polymer selected from the group consisting of polybutadiene rubber and styrene-butadiene rubber,
   (5) a solution prepared by bulk-polymerizing a portion of a mixture comprising styrene and a conjugated diene polymer selected from the group consisting of polybutadiene rubber and styrene-butadiene rubber, and
   (6) a solution prepared by bulk-polymerizing a portion of a mixture comprising styrene, a monomer copolymerizable therewith selected from the group consisting of alpha-methyl styrene, acrylonitrile and methylacrylate, plus a conjugated diene polymer selected from the group consisting of polybutadiene rubber and styrene-butadiene rubber, the polymerization in bulk of solutions (5) and (6) not exceeding a 40% by weight styrene conversion;

the improvement which comprises said material to be polymerized being present in said aqueous suspension at a ratio of from 10/90 to 60/40 by weight to water and the improvement further comprising conducting the majority of said suspension polymerization at a temperature of from 80 to 140° C. for 5 to 20 hours while the suspension is stabilized by incorporating therein a stabilizing system comprising from about 0.01 to about 1% of hydroxyethyl cellulose, and from about 0.01 to about 3% of fine particles of a member selected from the group consisting of a substantially water-insoluble inorganic carbonate, and mixtures thereof to thereby obtain a suspension polymerization product comprising particles having a particle grain size distribution such that greater than 70% of said particles have a grain size of from 14 to 40 mesh, all percentages being based on the weight of the suspension.

2. In a suspension polymerization process in which there is formed an aqueous suspension of a material to be polymerized selected from the group consisting of:
   (1) sytrene,
   (2) a mixture of styrene and a comonomer selected from the group consisting of alpha-methyl styrene, acrylonitrile and methylmethacrylate,
   (3) styrene and a conjugated diene polymer selected from the group consisting of polybutadiene rubber and styrene-butadiene rubber,
   (4) styrene, a comonomer polymerizable therewith selected from the group consisting of alpha-methyl styrene, acrylonitrile and methylmethacrylate, plus a conjugated diene polymer selected from the group consisting of polybutadiene rubber and styrene-butadiene rubber,
   (5) a solution prepared by bulk-polymerizing a portion of a mixture comprising styrene and a conjugated diene polymer selected from the group consisting of polybutadiene rubber and styrene-butadiene rubber, and
   (6) a solution prepared by bulk-polymerizing a portion of a mixture comprising styrene, a monomer copolymerizable therewith selected from the group consisting of alpha-methyl styrene, acrylonitrile and methylmethacrylate, plus a conjugated diene polymer selected from the group consisting of polybutadiene rubber and styrene-butadiene rubber, the polymerization in bulk of solutions (5) and (6) not exceeding a 40% by weight styrene conversion;

the improvement which comprises said material to be polymerized being present in said aqueous suspension at a ratio of from 10/90 to 60/40 by weight to water and the improvement further comprising conducting the majority of said suspension polymerization at a temperature of from 80 to 140° C. for 5 to 20 hours while the suspension is stabilized by incorporating therein a stabilizing system comprising from about 0.01 to about 1% of hydroxyethyl cellulose, and from about 0.01 to about 3% of fine particles of a member selected from the group consisting of a substantially water-insoluble inorganic phosphate, a substantially water-insoluble inorganic carbonate, and mixtures thereof and from about 0.0001% to about 0.02% of an anionic surface active agent, to thereby obtain a suspension polymerization product comprising particles having a particle grain size distribution such that greater than 70% of said particles have a grain size of from 14 to 40 mesh, all percentages being based on the weight of the suspension.

3. The process of claim 1 wherein said suspension stabilization system consists essentially of said hydroxyethyl cellulose and said fine particles of said substantially water-insoluble material.

4. The process of claim 2 wherein said suspension stabilization system consists essentially of said hydroxyethyl cellulose, said fine particles of said substantially water-insoluble material and said anionic surface active agent.

5. The process of claim 1 wherein said fine particles of said substantially water insoluble material are selected from the group consisting of a phosphate and a carbonate of a member selected from the class consisting of calcium, barium, strontium and magnesium, and have a grain size of from 0.1 micron to 10 microns, said material being present in an amount of from about 0.2 to 1.0%.

6. The process of claim 2 wherein said fine particles of said substantially water insoluble material are selected from the group consisting of a phosphate and a carbonate of a member selected from the class consisting of calcium, barium, strontium and magnesium, and have a grain size of from 0.1 micron to 10 microns, said material being present in an amount of from about 0.2 to 1.0%.

7. The process of claim 2 wherein said anionic surface active agents are selected from the group consisting of an alkali metal salt of an aliphatic acid and an alkali metal salt of an aralkyl sulfate.

8. The process of claim 1 wherein the material polymerized comprises styrene and said conjugated diene polymer.

9. The process of claim 2 wherein the material polymerized comprises styrene and said conjugated diene polymer.

10. The process of claim 1 wherein the material polymerized comprises styrene, said comonomer copolymerizable therewith and said conjugated diene polymer.

11. The process of claim 2 wherein the material polymerized comprises styrene, said comonomer copolymerizable therewith and said conjugated diene polymer.

12. The process of claim 1 wherein the material polymerized comprises a solution prepared by bulk-polymerizing a portion of a mixture comprising styrene and a conjugated diene polymer selected from the group consisting of polybutadiene rubber and styrene-butadiene rubber.

13. The process of claim 2 wherein the material polymerized comprises a solution prepared by bulk-polymerizing a portion of a mixture comprising styrene and a conjugated diene polymer selected from the group consisting of polybutadiene rubber and styrene-butadiene rubber.

14. The process of claim 1 wherein the material polymerized comprises styrene plus polybutadiene rubber.

15. The process of claim 1 wherein the material polymerized comprises styrene plus styrene-butadiene rubber.

16. The process of claim 2 wherein the material polymerized comprises styrene plus polybutadiene rubber.

17. The process of claim 2 wherein the material polymerized comprises styrene plus styrene-butadiene rubber.

References Cited

UNITED STATES PATENTS

| | | | |
|---|---|---|---|
| 2,566,567 | 9/1951 | Hutchinson et al. | 260—93.5 |
| 3,047,534 | 7/1962 | Dyer et al. | 260—880 |
| 3,222,343 | 12/1965 | Ingram et al. | 260—93.5 |
| 3,328,374 | 6/1967 | Ronden et al. | 260—93.5 |
| 3,425,966 | 2/1969 | Ronden et al. | 260—93.5 |
| 3,660,534 | 5/1972 | Carrock et al. | 260—880 |

JAMES A. SEIDLECK, Primary Examiner

U.S. Cl. X.R.

260—85.5 HC, 86.7, 88.2 C, 93.5 W